(12) United States Patent
Tse et al.

(10) Patent No.: US 10,907,440 B2
(45) Date of Patent: Feb. 2, 2021

(54) WOUND COMPOSITE CORE FOR MOLDED COMPONENTS

(71) Applicant: Schlumberger Technology Corporation, Sugar Land, TX (US)

(72) Inventors: Kyle Tse, Houston, TX (US); Colby Jarrett, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 15/496,920

(22) Filed: Apr. 25, 2017

(65) Prior Publication Data

US 2017/0306718 A1 Oct. 26, 2017

Related U.S. Application Data

(60) Provisional application No. 62/326,970, filed on Apr. 25, 2016.

(51) Int. Cl.
| | | |
|---|---|---|
| *E21B 33/12* | (2006.01) | |
| *E21B 33/134* | (2006.01) | |
| *B29C 43/18* | (2006.01) | |
| *B29L 31/26* | (2006.01) | |
| *B29L 9/00* | (2006.01) | |

(52) U.S. Cl.
CPC ............ *E21B 33/134* (2013.01); *B29C 43/18* (2013.01); *E21B 33/1204* (2013.01); *B29C 2043/182* (2013.01); *B29L 2009/00* (2013.01); *B29L 2031/26* (2013.01)

(58) Field of Classification Search
CPC .................................................... E21B 33/134
USPC .......................................................... 166/192
See application file for complete search history.

(56) References Cited

U.S. PATENT DOCUMENTS

| | | | | | |
|---|---|---|---|---|---|
| 4,960,643 | A | * | 10/1990 | Lemelson | B23D 61/185 384/907.1 |
| 6,011,111 | A | * | 1/2000 | Brennan | C08K 7/04 524/494 |
| 9,752,406 | B2 | * | 9/2017 | Hardesty | E21B 33/1208 |
| 10,494,893 | B2 | | 12/2019 | Tse et al. | |
| 2007/0044958 | A1 | * | 3/2007 | Rytlewski | C09K 8/68 166/250.01 |
| 2013/0118247 | A1 | * | 5/2013 | Akbari | F04C 2/1075 73/150 A |
| 2014/0116677 | A1 | * | 5/2014 | Sherlin | B29C 70/462 166/203 |
| 2014/0120346 | A1 | * | 5/2014 | Rochen | B29C 53/76 428/369 |
| 2014/0174728 | A1 | * | 6/2014 | Speer | E21B 23/04 166/250.01 |
| 2015/0101797 | A1 | * | 4/2015 | Davies | E21B 33/1208 166/193 |

(Continued)

*Primary Examiner* — Taras P Bemko
(74) *Attorney, Agent, or Firm* — Kelly McKinney

(57) ABSTRACT

A component on a composite bridge plug used for plugging a wellbore includes a first member including a wound composite material, and a second member including a molded fiber phenolic composite material. The wound composite material of the first member makes up more than half of a volume of the component. The first member is a convolute-wound core having a cylindrical shape. The second member forms an outer shell that is molded over an outer surface of the first member. The component is a cone of the composite bridge plug.

5 Claims, 3 Drawing Sheets

(56) References Cited

U.S. PATENT DOCUMENTS

| | | | |
|---|---|---|---|
| 2015/0159462 A1* | 6/2015 | Cutler | E21B 33/12 |
| | | | 166/377 |
| 2015/0239795 A1* | 8/2015 | Doud | C06B 45/18 |
| | | | 428/649 |
| 2015/0285026 A1* | 10/2015 | Frazier | E21B 33/134 |
| | | | 166/120 |
| 2016/0153463 A1* | 6/2016 | Bifulco | F01D 5/066 |
| | | | 60/805 |
| 2016/0252110 A1* | 9/2016 | Galloway | A61B 34/70 |
| | | | 60/327 |

* cited by examiner

WOUND COMPOSITE CORE FOR MOLDED COMPONENTS

CROSS-REFERENCE

This application claims the benefit of U.S. Provisional Application No. 62/326,970, filed on Apr. 25, 2016, the disclosure of which is hereby incorporated by reference in its entirety.

TECHNICAL FIELD

The present disclosure relates to plug systems having nonmetallic components to facilitate milling.

BACKGROUND

Many millable frac and bridge plugs utilize nonmetallic components to facilitate ease of milling during plug removal. Of the nonmetallic materials used, commonly filament and convolute-wound composites are used. These wound materials have high hoop strengths, making them well suited for cylindrical, load-bearing components such as cones and mandrels.

Molded phenolic is a material used due its ease of milling, relatively high shear, and bearing strength, and it can be molded into a final form. This makes complex geometry more economic at the production scale than materials that are machined to final form (i.e. wound composites).

SUMMARY

An apparatus and a method for manufacturing the apparatus are provided. The apparatus may take the form of a millable bridge plug. In some aspects, a method may include manufacturing a composite member of two different composite materials. The technique may include forming a first portion using a first composite material and forming a second portion by molding a second composite material over the first portion. The first composite material is different from the second composite material. The first portion may be formed by a winding process, and the second portion may be formed by a molding process.

This Summary is provided to introduce a selection of concepts in a simplified form that are further described below in the Description of the Invention section. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

Certain embodiments of the disclosure will hereafter be described with reference to the accompanying drawings, wherein like reference numerals denote like elements. It should be understood; however, that the accompanying figures illustrate the various implementations described herein and are not meant to limit the scope of various technologies described herein.

DESCRIPTION OF THE INVENTION

Figure 1:
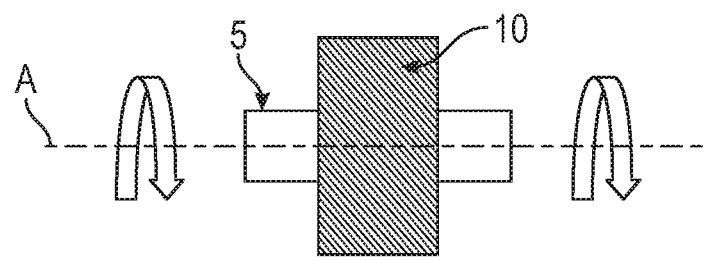
FIG. 1 illustrates a wound composite part around a mandrel, according to an aspect of this disclosure.

In the following description, numerous details are set forth to provide an understanding of some aspects of the present disclosure. However, it will be understood by those of ordinary skill in the art that the system and/or methodology may be practiced without these details and that numerous variations or modifications from the described aspects may be possible.

Certain terminology is used in the description for convenience only and is not limiting. The words "top", "bottom", "above," and "below" designate directions in the drawings to which reference is made. The term "substantially" is intended to mean considerable in extent or largely but not necessarily wholly that which is specified. The terminology includes the above-listed words, derivatives thereof and words of similar import.

Typically, when designing a frac or bridge plug component, one selects a material based on a desired functionality. However, some components could benefit from the advantages provided by both a molded phenolic and a wound composite. Making components out of both materials could increase functionality and/or decrease cost. Table 1 below lists some examples of possible advantages and disadvantages of the wound composites and molded fiber phenolic materials.

TABLE 1

| Material Descriptions Advantages/Disadvantages | |
| --- | --- |
| Wound Composite | Molded Fiber Phenolic |
| Low volumetric cost | High volumetric cost |
| Machined to final form | Molded to final form |
| High hoop strength | Low hoop strength |
| Low bearing strength | High bearing strength |
| Low directional shear strength | High shear strength |

In conventional systems, frac or bridge plug components that are small in overall volume, require complex geometries or features, and/or do not have a functional requirement for high hoop strength, are typically made of molded composite. Components that are large in overall volume, have simple geometries, and/or in which have a functional requirement for a high hoop strength, are typically made of wound composite and machined to a final shape.

Complex components of millable frac plugs, in which a large hoop strength is desired, are typically made out of a wound composite and machined to final form. This can be problematic for complex components at a production scale due to the cost of machining complex geometries. If the component was molded, the production price of that component would be mostly independent of geometric complexity. For many components, molded phenolic does not have the hoop strength desired for particular applications, preventing these parts from being molded to final form.

Aspects described herein include a manufacturing method to enable a composite frac plug component to be formed out of both molded fiber phenolic and wound composite. Benefits of the composite frac plug include providing 1.) a low volumetric cost of wound composite and a low manufacturing cost of molded phenolic, and 2.) a high hoop strength of wound composite and high bearing/shear strength of molded composite. A performance benefit of both materials may be achieved without negatively affecting part cost.

The composite frac plug component may include a core of wound composite, which provides the frac plug component with the strength advantages of a wound composite. One aspect may include winding a composite cylinder that provides structural strength with minimal machining or surface features desired. The wound cylinder could make up the bulk of the volume, thereby reducing molded material costs. A phenolic shell may be molded over the wound cylinder to achieve a net-shape part. The molded material may be used to add complex features. In conventional systems, these features may have been machined otherwise. Additionally, the molded material may provide bearing and shear strength not achieved with the wound material alone.

FIGS. 1 through 5 illustrate several steps for manufacturing a composite frac plug having both molded fiber phenolic material and a wound composite. FIG. 1 illustrates a winding process, which includes winding a composite material about a winding mandrel 5 to form a wound composite member 10. In an aspect, the winding process may include a conventional filament or convolute-wound process. The winding mandrel 5 rotates about an axis A. In an aspect, axis A extends through a center of the mandrel 5. The composite member 10 may include a minimal number of features, and may primarily form a cylindrical tube-like structure.

Figure 2:
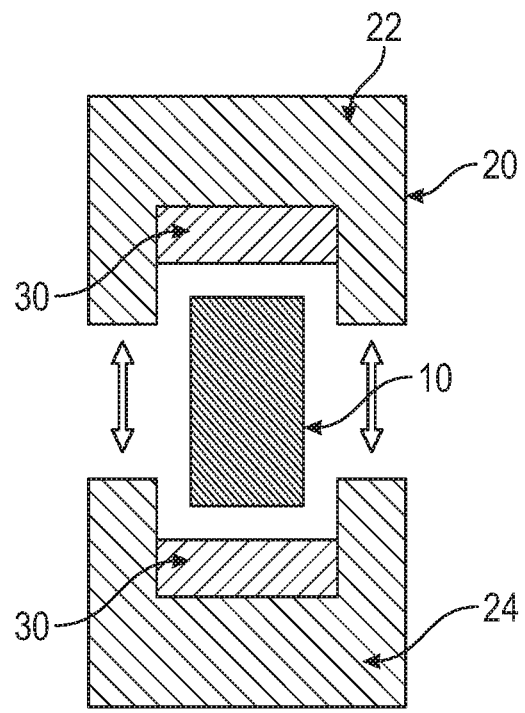
FIG. 2 illustrates the wound composite part shown in FIG. 1 positioned within a mold in a first position, according to an aspect of this disclosure.

FIG. 2 illustrates the wound composite member 10 positioned within a two piece mold 20. The two piece mold 20 may include an upper mold 22 and a lower mold 24. The two piece mold 20 is in an open position, whereby the upper mold 22 is spaced apart from the lower mold 24. Each of the upper and lower molds 22 and 24 may include a molded composite preform 30 within.

Figure 3:
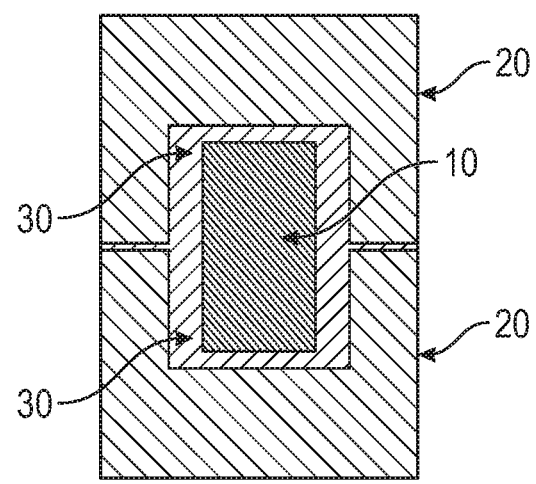
FIG. 3 illustrates the would composite part shown in FIG. 1 positioned within a mold in a second position, according to an aspect of this disclosure.

FIG. 3 illustrates the two piece mold 20 in a closed position, whereby the upper mold 22 and the lower mold 24 are compressed towards each other. During compression, the wound composite member 10 may be fully encapsulated by the molded composite material 30.

Figure 4:
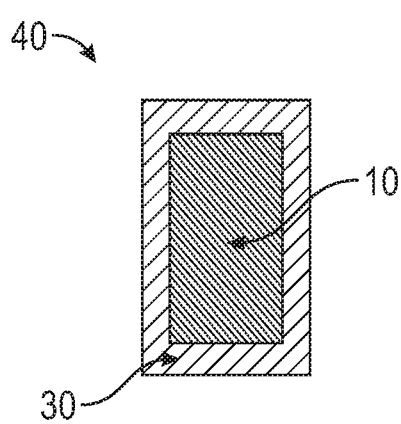
FIG. 4 illustrates a wound composite with a molded outer shell, according to an aspect of this disclosure.

FIG. 4 illustrates a final composite frac plug 40 comprising the wound composite member 10 at its core and the molded composite material 30 formed about the wound composite member 10. The resulting composite frac plug 40 may be predominantly made of wound composite by volume. The raw composite material is generally cheaper than molded phenolic, which makes the resulting composite frac plug 40 cheaper to manufacture. The composite frac plug 40 retains an overall hoop strength similar to that of a part made of wound composite. Furthermore, complex geometries may be molded onto the final shape of the frac plug 40, allowing difficult-to-machine features to be added. This results in a frac plug 40 that is cheaper to manufacture at the production scale.

Figure 5:
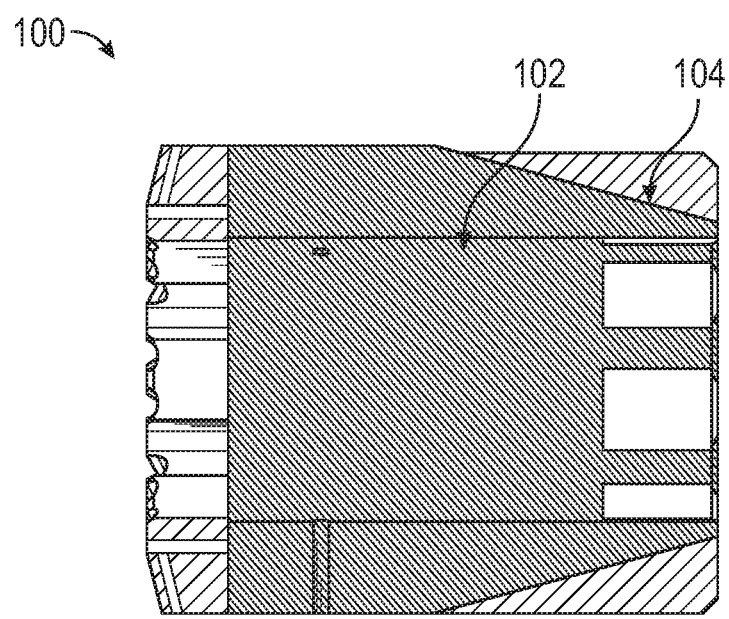
FIG. 5 illustrates a composite plug lower cone, according to an aspect of this disclosure.

FIG. 5 illustrates an example of a feature molded onto the frac plug 40, according to an aspect of this disclosure. A complex geometry that may be molded to the final shape and that also has a high hoop strength may include, for example, a lower cone 100 of a composite frac/bridge plug. The composite plug lower cone 100 may comprise a hybrid composite material with filament or convolute-wound core 102 with a molded composite shell 104.

These specific embodiments described above are for illustrative purposes and are not intended to limit the scope of the disclosure as otherwise described and claimed herein. Modification and variations from the described embodiments exist. The scope of the invention is defined by the appended claims.

What is claimed:

1. A component on a composite bridge plug used for plugging a wellbore, the component comprising:
    a first member comprising a wound composite material; and
    a second member comprising a molded fiber phenolic composite material,
    wherein the wound composite material of the first member makes up more than half of a volume of the component,
    wherein the first member is a convolute-wound core having a cylindrical shape,
    wherein the second member forms an outer shell that is molded over an outer surface of the first member, and
    wherein the component is a cone of the composite bridge plug.

2. The component of claim 1, wherein a final shape of the second member molded over the outer surface of the first member comprises a tapered outside body section that decreases in thickness from a first end towards a second end.

3. A method of forming a component of a composite bridge plug comprising:
    forming a first composite member by winding a composite material about a winding mandrel in a convolute-wound process to form a convolute-wound core having a cylindrical shape; and
    forming a second composite member about the convolute-wound core, the second composite member comprising a molded fiber phenolic composite material,
    wherein forming the second composite member about the convolute-wound core comprises:
        molding the second composite material onto the first composite member; and
        fully encapsulating an outer surface of the first composite member by the second composite member, and
    wherein the convolute-wound core makes up more than half of a volume of the component,
    wherein the component is a cone of the composite bridge plug.

4. The method of claim 3, wherein the molding step comprises:
    positioning the first composite member within a two-piece mold comprising an upper mold and a lower mold; and
    compressing the upper mold and the lower mold towards each other.

5. The method of claim 3, wherein a final shape of the second composite member molded onto the convolute wound core of the first composite member comprises a tapered outside body section that decreases in thickness from a first end towards a second end.

* * * * *